United States Patent [19]
Sandling et al.

[11] Patent Number: 5,551,471
[45] Date of Patent: Sep. 3, 1996

[54] VALVE WITH CONSUMABLE VENT HOLE SEAL DEVICE

[75] Inventors: Michael Sandling, Loveland; David E. Klotter, Cincinnati; Edward Scheid, Milford; M. R. Ramakrishnan, Cincinnati, all of Ohio

[73] Assignee: Xomox Corporation, Cincinnati, Ohio

[21] Appl. No.: 395,147

[22] Filed: Feb. 27, 1995

[51] Int. Cl.⁶ .................................................. F16K 17/38
[52] U.S. Cl. .............................................. 137/74; 137/79
[58] Field of Search ................................ 137/72, 74, 79

[56] References Cited

U.S. PATENT DOCUMENTS

| | | |
|---|---|---|
| 4,393,889 | 7/1983 | Binegar et al. |
| 4,515,174 | 5/1985 | Hollister et al. ........................ 137/72 |
| 4,610,266 | 9/1986 | Sandling ................................ 137/315 |
| 4,628,953 | 12/1986 | Correll et al. .......................... 137/74 |
| 5,244,008 | 9/1993 | Bauer ...................................... 137/385 |
| 5,326,074 | 7/1994 | Spock, Jr. .............................. 251/214 |

OTHER PUBLICATIONS

Xomox Corp., "Tufline Sleeved Plug Valves," 1994, p. 24.
Duriron Co., "Durco G4 Sleeveline Valves," 1989, pp. 6, 8, 9.

*Primary Examiner*—John C. Fox
*Attorney, Agent, or Firm*—Dinsmore & Shohl

[57] ABSTRACT

A valve with a rotatable valving member has a vent hole extending between an internal cavity of the valve and another location to which excess pressure can be vented. The vent hole is sealed with a consumable vent hole seal device that ruptures or otherwise vents under the high temperature and/or pressure of a fire and prevents dangerous pressure buildup within the internal cavity of the valve.

19 Claims, 2 Drawing Sheets

VALVE WITH CONSUMABLE VENT HOLE SEAL DEVICE

TECHNICAL FIELD

The invention relates generally to valves and more particularly to valves that trap fluid in internal cavities and that are subjected to excess pressure when that trapped fluid is exposed to the heat and pressure conditions of a fire. The invention will be specifically disclosed in connection with a fire-tested valve having a valving member that traps process fluid within the valving member's fluid passageway member when the valving member is in a closed position.

BACKGROUND OF THE INVENTION

Many times process fluids that are flowing through a valve collect in internal cavities in the valve. A typical rotary valve, for example, includes a valving member that is disposed in a fluid passage of a valve intermediate the valve's inlet and outlet. This valving member is rotated about an axis that is generally perpendicular to the fluid flow path through the valve, and the valving member is rotated to selectively bring an internal passageway that extends through the valving member into and out of registry with the valve's fluid flow path. When the valving member of a two-way valve is in its fully open position, its internal passageway is aligned and becomes a part of the flow path through the valve. Such a two-way valving member is movable to the fully closed or shutoff position by rotating the valving member 90 degrees from its fully open position. When so rotated, the internal fluid passageway through the valving member no longer communicates with the fluid flow passage through the valve, and the valving member functions to block fluid flow through the valve.

When the valving member is moved from open to closed positions while a process fluid is flowing through the valve, a small amount of the process fluid is trapped in the valving member's internal fluid passageway, sealed from both the valve inlet and valve outlet. While only a relatively small amount of process fluid is trapped, such trapped fluid has proved to be problematic when the valve is exposed to extremely high temperatures and pressures, such as occurs during fires. Under such extreme conditions, the trapped fluid within the valving member's fluid passageway becomes superheated, and the pressure and temperature within the closed cavity in which the fluid is trapped may be greater than the design capabilities of the valve, resulting in structural failure.

Recognizing the problems of trapping fluid in valve cavities, several prior art attempts have been made to alleviate such problems by venting such trapped fluid. In one approach, excess pressure in internal valve cavities is relieved by self relieving valve seals that are designed to rupture or otherwise relieve pressure at predetermined temperatures and pressures. Other valve designs rely upon the valve seals themselves to decompose sufficiently during a fire to relieve any excess pressure. However, in most cases, excess pressure is reached before the seals have reached a guaranteed decomposition temperature.

In another approach, vent holes are formed in the valve components to insure that the internal cavities are always in fluid communication with another location of the valve to which excess pressure can be relieved. A common cavity vented in the prior art is the internal passageway of a rotatable valving member. For example, the cavity formed by the valving member's internal flow passageway sometimes is vented by vent holes that extend between the valving member's internal passageway and a location external to the valving member. These vent holes are usually drilled in a direction perpendicular to the direction of the valving member's internal flow passage, either through the side wall (to the internal flow passage of the valve body) or the bottom wall (to the closed portion of the valve chamber opposite the shaft opening) of the valving member.

While the venting of valve cavities has proved advantageous, it is not without difficulties. For example, if the internal flow passage of a plug valve or a ball valve is vented, it must be vented on the upstream side of the valving member. Otherwise, any potential leakage past the primary seals on the upstream side of the valving member (which leakage is rendered more probable due to possible downstream shifting of the valving member relative to the valve body from line pressure) will flow around the valving member, through the valving member's internal flow passage, and leak through the vent hole. As a consequence, prior art valves with venting of a valving member's internal flow cavities generally have been rendered uni-directional. Of course, unidirectional valves must be marked to indicate the required flow direction for the valve. Further, unidirectional cannot be used in all applications, and inherently add increased risk for malfunction due to improper assembly or installation.

SUMMARY OF THE INVENTION

Accordingly, it is an object of the invention to provide fire-tested valve that does not trap fluids in closed cavities during fire conditions.

Another object of the invention is to provide a fire-tested valve having venting the cavities in the valve that is suitable for multidirectional process fluid flow.

It is another object of the invention to provide a valve that vents any fluid trapped in the valve whenever the valve is subjected to conditions of extreme heat and/or pressure.

Yet another object of one aspect of the invention is to provide a valve having a valving member that is rotated to bring its internal fluid passageway into and out of fluid communication with a valve flow path during normal operating conditions, but that is in fluid communication with the valve flow passage at all rotational positions when the valve is exposed to fire conditions.

Additional objects, advantages and other novel features of the invention will be set forth in part in the description that follows and, in part, will become apparent to those skilled in the art upon examination of the invention. The objects and advantages of the invention may be realized and obtained by means of the instrumentalities and combinations particularly pointed out in the appended claims.

To achieve the foregoing and other objects and in accordance with the purposes of the present invention as described above, a valve assembly is provided with a high temperature and/or pressure relief for a cavity that receives fluid flowing through the valve. The valve assembly includes a valve with a valve body having an inlet and an outlet and an internal flow passage extending between the inlet and the outlet. A valving member is movably disposed in the internal flow passage of the valve body for selectively controlling fluid flow through the internal passage of the valve body. A vent hole is provided for vacating fluid from the cavity. A vent hole seal device is sealingly disposed within the vent hole for preventing fluid flow through the vent hole during normal operating conditions. The vent hole seal device is formed of a consumable material that is at least partially consumed to pressure relief for the cavity when the valve is exposed to predetermined ambient conditions of temperature and/or pressure.

In another aspect of the invention, a valving member having a consumable vent hole seal device includes a fluid flow blocking structure with a fluid passageway extending therethrough, and the cavity is at least partially formed in the valving member. The valve assembly preferably includes an actuating mechanism for selectively effecting rotation of the valving member relative to the valve body. The actuating member is operative to move the valving member between a first open position in which the valving member's fluid passageway is aligned with and allows fluid flow through the internal flow passage and a second closed position in which the internal flow passage is substantially blocked by the blocking structure.

In one preferred form of the invention, the vent extends between the cavity in the valving member and the internal flow passage of the valve body. The vent hole seal device is formed of a material that undergoes phase or dimensional change when subjected to high temperature and/or pressures. In many applications, the preferred material for the vent hole seal device is a fluorinated hydrocarbon material, such as polytetrafluroethylene.

According to another aspect of the invention, the vent hole seal device is secured in the vent hole by an adjustable retainer, and the dimensions of the vent hole seal device can be controlled to vary the ambient conditions at which the vent hole seal device will allow pressure in the cavity to be vented.

Still other objects of the present invention will become apparent to those skilled in this art from the following description wherein there is shown and described a preferred embodiment of this invention, simply by way of illustration, of one of the best modes contemplated for carrying out the invention. As will be realized, the invention is capable of other different obvious aspects all without departing from the invention. Accordingly, the drawing and description will be regarded as illustrative in nature and not as restrictive.

BRIEF DESCRIPTION OF THE DRAWINGS

The accompanying drawings incorporated in and forming a part of the specification, illustrates several aspects of the present invention, and together with the description serve to explain the principles of the invention. In the drawings.

Reference will now be made in detail to the present preferred embodiment of the invention, an example of which is illustrated in the accompanying drawings, wherein like numerals indicate the same elements throughout the views.

DETAILED DESCRIPTION OF THE PREFERRED EMBODIMENT

Figure 1:
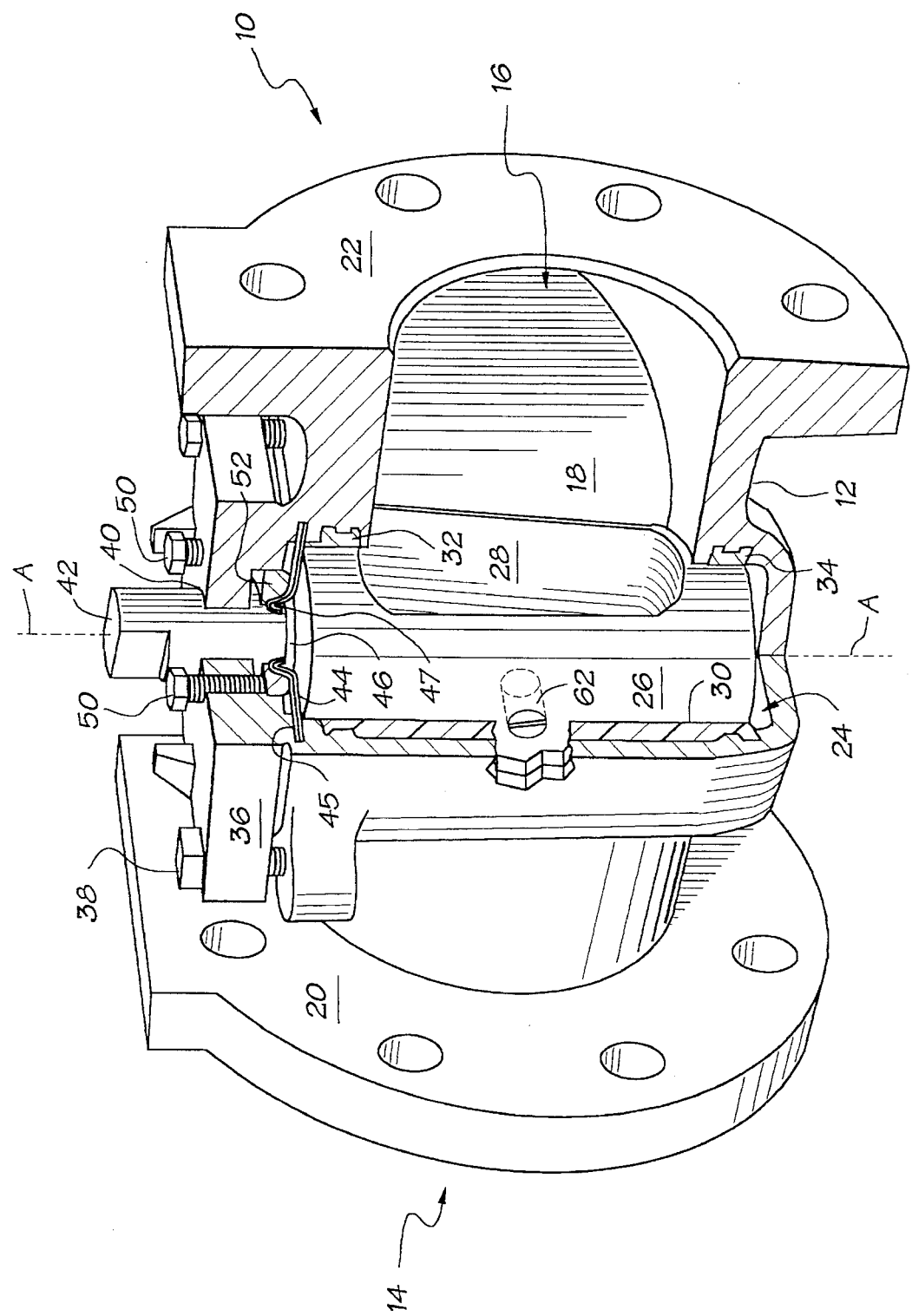
FIG. 1 is a perspective view of a valve having a valving member with a vent hole seal device constructed in accordance with the principles of the present invention, with a portion of the valve body cut away to more clearly illustrate the valving member.

Referring now to the drawings, FIG. 1 shows one of many types of valves in which the invention has utility. In the specific embodiment illustrated, a tapered plug valve, generally designated by the drawing numeral 10 is shown. The valve 10 is formed by a body 12 having an inlet 14 (obscured by the valve body 12) and an outlet 16. An internal flow passage 18 extends between the inlet 14 and outlet 16. The inlet 14 and outlet 16 are surrounded by flanges 20 and 22 respectively, by which the opposite ends of the body 12 may be connected to similarly flanged conduits (not shown) by bolts or other appropriate fasteners (also not shown). Alternatively, in lieu of fasteners, the valve 10 also may be connected to fluid conduits by any number of alternative methods, such as threaded connections, welding and other means well known to those skilled in the art.

The body 12 has a valve chamber 24 for accommodating a valving member 26, which valving member 26 is specifically illustrated as a tapered plug member in the illustrated embodiment. The valve chamber 24 extends in a direction substantially perpendicular to the internal flow passage 18 and is closed at its lower end (as illustrated in FIG. 1) and open at its upper end (again, as illustrated in FIG. 1), it being understood that the valve 10 has no particular required orientation, and that orientation terms such as "upper," "lower," "top" and "bottom" are used herein only for purposes of description and are not intended to imply orientation restraints of the valve 10.

The valving member 26 has an internal passageway 28 which extends through the valving member 26. The internal passageway 28 is brought into and out of registry with the internal flow passage 18 by rotating the valving member 26. In FIG. 1, the valving member 26 is illustrated in its fully open position wherein the internal passageway 28 is aligned with the internal flow passage 18. As those skilled in the art will readily appreciate, the specific valve 10 illustrated in the drawings is a two-way plug valve, and the valving member 26 is rotated about the axis A ninety degrees to move the valving member 26 to a closed position.

A sleeve 30 is interposed between the valving member 26 and the valve chamber 24. The sleeve 30, which is preferably formed of a fluorinated hydrocarbon polymer, such as polytetrafluroethylene, is aperatured in correspondency with the valving member 26 so as to permit fluid flow through the valve 10 when the internal passageway 28 of the valving member 26 is rotated into alignment with the valve body's internal flow passage 18. The sleeve 30 has a pair of annular ribs 32 and 34 at the top and bottom of the illustrated valve chamber 24.

A valve cover 36 is secured to the top of the valve body 12 above the valve chamber 24 by a plurality of bolts 38. The valve cover 36 functions to close the open end of the valve chamber 24, and includes a centrally disposed opening 40 for accommodating an actuating mechanism 42. The specific actuating mechanism illustrated is in the form of a shaft 42 is rigidly secured at its lower (as viewed in FIG. 1) end to the valving member 26. The opposite end (the upper end as illustrated in FIG. 1) of the actuating shaft 42 extends through the valve cover 28 to an external location where it may be attached to an appropriate actuator that is used to selectively rotate the valving member 26 between open and closed positions about a rotational axis depicted by the broken line A in FIG. 1. A diaphragm 44 is interposed between the valve body 12 and the valve cover 28. The diaphragm 44 preferably is formed of a plastic fluorinated hydrocarbon material, such as polytetrafluoroethylene. The diaphragm 44 extends from the valve body 12 to the actuating shaft 42 to seal the upper opening of the valve chamber 24.

The upper surface of the valving member 26 is generally planar and includes an upstanding shoulder 46 that is circumferentially disposed about the actuating shaft 42. A wedge ring 47 with a triangular cross-sectional configuration is fitted on the shoulder 46. Like the diaphragm 44, the wedge ring 47 is formed of a plastic material, preferably a fluorinated hydrocarbon material, such as polytetrafluoroethylene. The diaphragm 44 is fitted around the wedge ring 47 so as to form an inverted "V" shape at its inner circumference. The radially innermost portion of the diaphragm 44 forms a cylindrical surface that is in sealing contact with the actuating shaft 42. The seal between the diaphragm 44 and the actuating shaft 42 is enhanced by radial compression of the wedge ring 46. A metal diaphragm 45 may be placed over the plastic diaphragm 44 to protect the plastic diaphragm 44 when valve cover 36 is tightened. The metal diaphragm 45 further functions to seal the open end of the valve chamber 24 if the plastic diaphragm 44 disintegrates during fire conditions. The valve cover 36 includes a three adjusting bolts 50 (only two of which are shown in FIG. 1) that contact a thrust ring 52 that allows adjustment of the sealing pressure formed by the diaphragm 44 and wedge ring 47.

Figure 2:
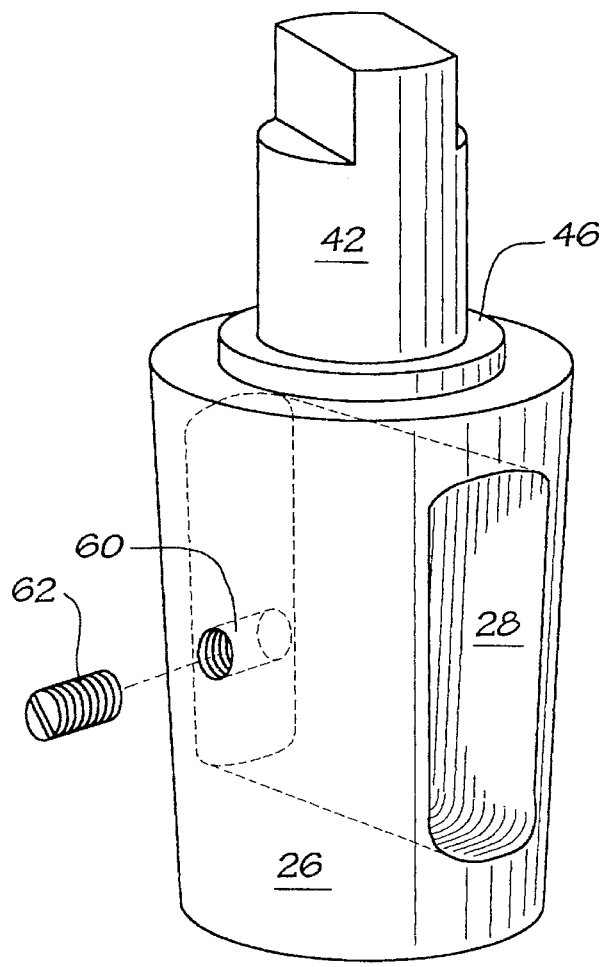
FIG. 2 is a perspective view of the valving member of FIG. 1 removed from the valve body, illustrating a threaded vent extending through the sidewall of the valving member and a vent hole seal device for sealing the threaded vent hole during normal operating conditions.

Turning now to FIG. 2, the valving member 26 is shown is greater detail. In accordance with the principles of the present invention, the valving member 26 includes a vent 60 that extends through the sidewall of the valving member 26 in a direction substantially perpendicular to the valving member's internal passageway 28. The specific vent 60 illustrated in FIG. 2 is a in the form of a bore of generally cylindrical configuration that has internal threads that are adapted to receive a correspondingly threaded vent hole seal device 62. While the valving member 26 is preferably formed of a metallic material or alloy, such as a stainless steel, nickel, Hastelloy, Inconel, titanium or zirconium, that will withstand the extreme temperatures of a fire, the vent hole seal device 62 is formed of a consumable material. As used in the present application and claims, the term "consumable material" shall mean a material that, when sealingly disposed in a valve cavity vent and subjected to predetermined ambient temperature and/or pressure conditions, will undergo sufficient phase and/or dimensional change to allow the vent to relieve pressure from the cavity. The vent hole seal device 62 also is preferably formed of a material that is inert to the process fluids with which the valve 10 is to be used. In the preferred embodiment, the consumable material used for the vent hole seal device 62 is a fluorinated hydrocarbon polymer such as polytetrafluroethylene. When subjected to the extreme temperatures of a fire, a vent hole seal device 62 formed of polytetrafluroethylene will sublimate, and will allow the vent 60 to relieve pressure buildup in the cavity formed by the valving member passageway 28 when the valving member is in its closed position. Other consumable materials that melt, or simply sufficiently change in dimension relative to the vent 60 at fire temperatures or other predetermined ambient conditions may be used for the vent hole seal device 62. Whatever the consumable material used, it is important in the preferred embodiment that the material at least partially disintegrate, change phase or reduce in dimension relative to the vent during fire conditions so as to relieve pressure buildup in the cavity formed by the internal flow passageway 28 in the valving member 26.

When the valving member 26 is used in the valve body 12 and rotated to its closed position (rotated approximately 90° from the position illustrated in FIG. 1), the vent 60 extends through the sidewall of the valving member 26 between the valving member's internal passageway 28 and the internal flow passage of the valve body 12. Under normal operating conditions, the vent hole seal device 62 seals the vent 60, and the vent hole seal device 62, like the remaining portions of the sidewall of the plug member 26, functions as a blocking structure to prevent fluid flow through the internal passage 18 of the valve 10 when the valving member 26 is in its closed position. However, when the valve 10 is exposed to the extreme temperature and pressure conditions created by a fire, and the valving member 26 is rotated to the closed position, the vent hole seal device 62 will disintegrate or otherwise allow pressure relief from the internal passageway 28. This, of course, allows any fluid or pressure trapped in the internal passageway 28 of the valving member 26 to vent.

Figure 3:
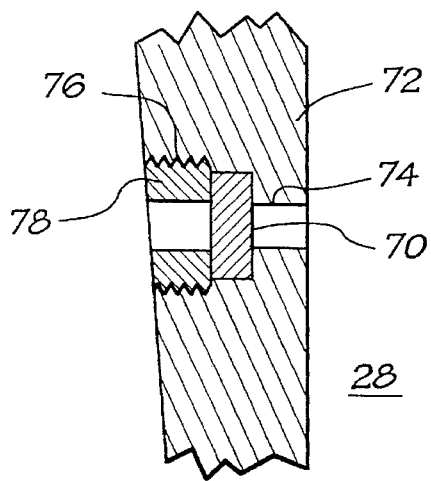
FIG. 3 is a fragmentary cross-sectional view of a sidewall of a valving member similar to the valving member sidewall of FIG. 2, but illustrating a further embodiment of a vent hole seal device.

FIG. 3 shows a further embodiment of a vent hole seal device, which vent hole seal device is designated by the numeral 70 in the drawing. Unlike the vent hole seal device 62 of FIGS. 1 and 2, the vent hole seal device 70 has a thickness that is substantially less than that of the valving member sidewall. In FIG. 3, the valving member sidewall, which is illustrated in cross-section, is designated by the drawing numeral 72. The vent in FIG. 3 has a two-stage diameter, including a first portion 74 extending between the valving member's internal passageway 28 and the central portion of the sidewall, and a second portion 76 of relatively larger diameter extending from the terminus of the portion 74 to the exterior surface of the valving member sidewall 72. The vent hole seal device 70 has dimensions that fit into the second vent portion 76 but not into the first portion 74. This vent hole seal device 70 is placed in the vent through the second portion 76, and is retained in position by a retainer 78. The surface of the second portion 76 is threaded, and this portion 76 threadably receives the mating threads on the exterior of the retainer 78. The retainer 78 has a central opening for receiving a wrench for removal of the retainer 78. The embodiment of FIG. 3 advantageously allows substantially greater control over the thickness of the vent hole seal device 70. Significantly, such increased control of vent hole seal device thickness allows correspondingly increased control over the temperature and/or pressure at which the vent hole seal device will allow pressure relief through the vent 74,76.

Figure 4:
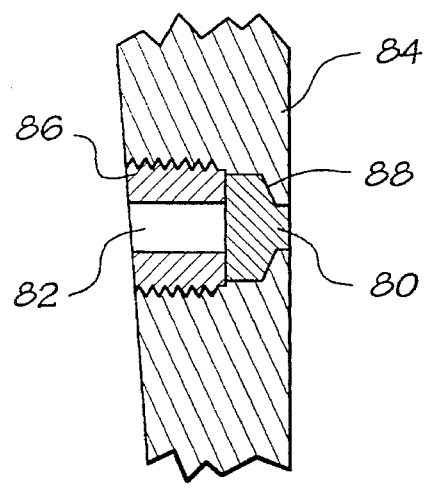
FIG. 4 is a fragmentary cross-sectional view of a valving member sidewall similar to the valving member sidewalls of FIGS. 2 and 3, but illustrating a still further embodiment of a vent hole seal device constructed according to the invention.

A still further embodiment of the invention is shown in FIG. 4 in which a vent hole seal device formed by polytetrafluoroethylene seal material 80 is secured in a vent hole 82 of a valving member sidewall 84 by a retainer 86. In this last mentioned embodiment, the vent hole is formed by drilling through the valving member sidewall 84, and the vent hole seal device 80 includes a tapered wall 88 that is angled and shaped to accommodate a vent hole formed by a conical end of a drill bit. The tapered design of the vent hole seal device 80 provides for enhanced sealing between the vent hole 82 and the vent hole sealing device 80 as the device 80 is urged into the tapered vent hole 82. Like the embodiment of FIG. 3, the radially outermost portion of the vent hole 82 has a cylindrical configuration, and is threaded to receive a matingly threaded retainer 86 having a central opening.

In summary, numerous benefits have been described which result from employing the concepts of the present invention. Advantageously, sealing the vent hole with a vent hole seal device insures that process fluids will not be trapped in an internal cavity of the valve, such as the internal passageway 28 of the valving member 26 when the illustrated valving member 26 is its closed position and exposed to fire conditions. When subjected to such high temperatures and/or pressures, the vent hole seal device ruptures or otherwise vents and the internal passageway 28 of the valving member 26 is in fluid communication with the fluid flow passage 18 of the valve 10 at all rotational positions of the valving member 26, insuring that any pressure buildup in the valve member's internal passageway will be vented. The use of a vent hole seal device in the vent also allows the valving member 26 to function normally under normal operating conditions, selectively blocking the flow of fluid through the valve 10 in accordance with the valving member's rotational position. Furthermore, the invention typically allows a valving member to be vented in either the upstream or downstream sides, eliminating the need to use vented valves only for unidirectional applications.

The foregoing description of a preferred embodiment of the invention has been presented for purposes of illustration and description. It is not intended to be exhaustive or to limit the invention to the precise form disclosed. Obvious modifications or variations are possible in light of the above teachings. For example, it will be appreciated that the invention has utility on valves of different types. Thus, while the invention has been specifically disclosed in connection with a plug valve, it could be used on a ball valve, or any other valve having a cavity that traps process fluid flowing through the valve. It also will be appreciated that the invention allows venting of cavities to locations other than the valve body flow path. For example, the plug member of the invention could be used to seal a vent from an internal passageway of the valving member through the valving member's bottom wall to the closed cavity formed by the valve chamber. Furthermore, consumable materials other than polytetrafluroethylene may be used, including consumable materials that change in dimension relative to the vent hole or that partially or fully decompose during the extreme temperature/pressure conditions of a fire. The embodiment was chosen and described in order to best illustrate the principles of the invention and its practical application to thereby enable one of ordinary skill in the art to best utilize the invention in various embodiments and with various modifications as are suited to the particular use contemplated. It is intended that the scope of the invention be defined by the claims appended hereto.

What is claimed is:

1. A valve assembly, comprising:
   (a) a valve, the valve including;
      (i) a valve body having an inlet and an outlet and an internal flow passage extending between the inlet and the outlet;
      (ii) a valving member movably rotatably in the internal flow passage of the valve body for selectively controlling fluid flow through the internal passage; the valve defining a cavity that receives fluid flowing through the internal flow passage of the valve body; wherein the valving member includes a fluid flow blocking structure with a fluid passageway extending therethrough, and wherein the cavity is at least partially formed in the valving member;
   (b) a vent for relieving pressure in the cavity;
   (c) a vent hole seal device sealingly disposed within the vent for preventing fluid flow through the vent, the vent hole seal device being formed of a consumable material that allows pressure relief through the vent hole when the valve is exposed to predetermined ambient conditions; and
   (d) an actuating mechanism for selectively effecting rotation of the valving member relative to the valve body, the actuating member being operative to move the valving member between a first open position in which the valving member's fluid passageway is aligned with and allows fluid flow through the internal flow passage and a second closed position in which the internal flow passage is substantially blocked by the blocking structure.

2. A valve assembly as recited in claim 1 wherein the consumable material is at least partially consumed when the valve is exposed to predetermined conditions of temperature and/or pressure.

3. A valve assembly as recited in claim 2 wherein the vent extends between the cavity in the valving member and the internal flow passage of the valve body.

4. A valve assembly as recited in claim 2 wherein the vent hole seal device is formed of a fluorinated hydrocarbon material.

5. A valve assembly as recited in claim 4 wherein the fluorinated hydrocarbon material is polytetrafluoroethylene.

6. A valve member as recited in claim 1 wherein the vent hole seal device member is threadably received in the vent.

7. A valve assembly as recited in claim 1 wherein the valve is a plug valve.

8. A valve assembly as recited in claim 1 further including a retainer for securing the vent hole seal device in the vent.

9. A valve assembly as recited in claim 1 wherein the thickness of the vent hole seal device is substantially less than the thickness of the valving member wall.

10. A valve assembly as recited in claim 1 wherein the vent hole seal device is secured in the vent by an adjustable retainer, and the dimensions of the vent hole seal device can be controlled to vary the ambient conditions at which the vent hole seal device will allow pressure in the cavity to be vented.

11. A valve assembly as recited in claim 1 wherein the vent hole is tapered and the vent hole seal device is tapered to sealingly fit into the tapered vent hole.

12. A valve assembly, comprising:
   (a) a valve body, the body having an inlet and an outlet and an internal flow passage extending therebetween;
   (b) a valving member, the valving member being movably disposed in the flow passage for selectively controlling the flow of fluid therethrough, the valving member being including a fluid flow blocking structure with a passageway extending therethrough, the valving member being selectively movable within the body between a first open position in which the passageway is aligned with and allows fluid flow through the internal flow passage and a second closed position in which the internal flow passage is substantially blocked by the blocking structure, the blocking structure including a vent hole operative to vent fluid in the valving member passageway when the valving member is in the closed position;
   (c) an actuating mechanism for selectively effectuating rotation of the valving member relative to the valve body, the actuating mechanism being operative to move the valving member between the first and second positions; and
   (d) a vent hole seal device sealingly disposed in the vent hole, the vent hole seal device being formed of a consumable material that allows pressure relief through the vent hole when the valving member is exposed to predetermined ambient conditions.

13. A valve assembly as recited in claim 12 wherein the consumable material allows venting of pressure through the vent hole when the valve is exposed to predetermined conditions of temperature and/or pressure.

14. A valve assembly as recited in claim 13 wherein the vent hole seal device is formed of a fluorinated hydrocarbon material.

15. A valve assembly as recited in claim 14 wherein the fluorinated hydrocarbon material is polytetrafluoroethylene.

16. A valve assembly as recited in claim 13 wherein the vent hole seal device is threadably received in the vent hole.

17. A valve assembly as recited in claim 12 wherein the valve is a plug valve.

18. A valve assembly as recited in claim 13 wherein the vent hole seal device is secured in the vent hole by an adjustable retainer, and the dimensions of the vent hole seal device can be controlled to vary the ambient conditions at which the vent hole seal device will allow pressure in the cavity to be vented.

19. A valve assembly as recited in claim 13 wherein the vent hole is tapered and the vent hole seal device is tapered to sealingly fit into the tapered vent hole.

* * * * *